Figures 5, 6, 7:
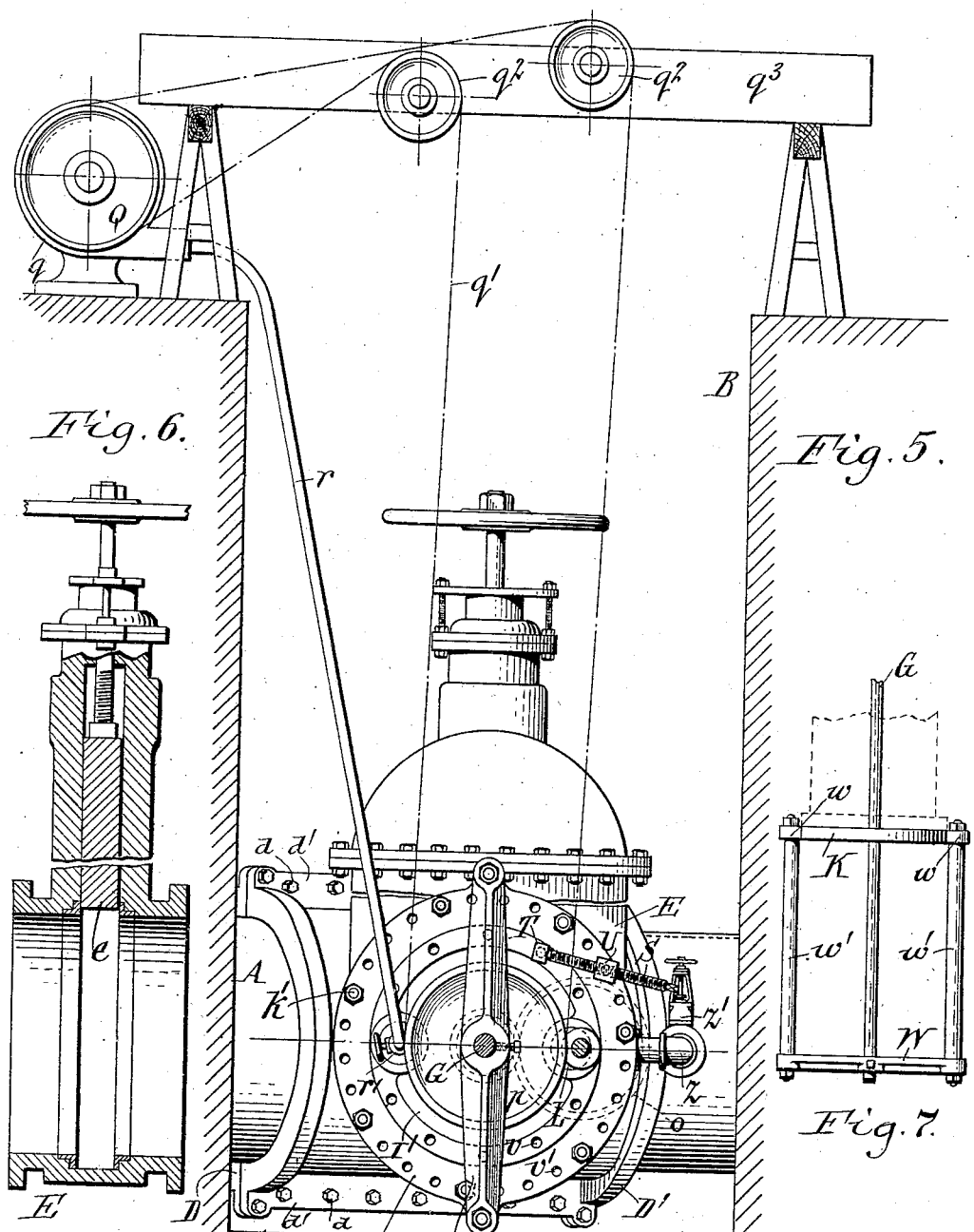

No. 884,565. PATENTED APR. 14, 1908.
J. H. B. BRYAN.
PIPE TAPPING DEVICE.
APPLICATION FILED JAN. 11, 1906.
3 SHEETS—SHEET 1.
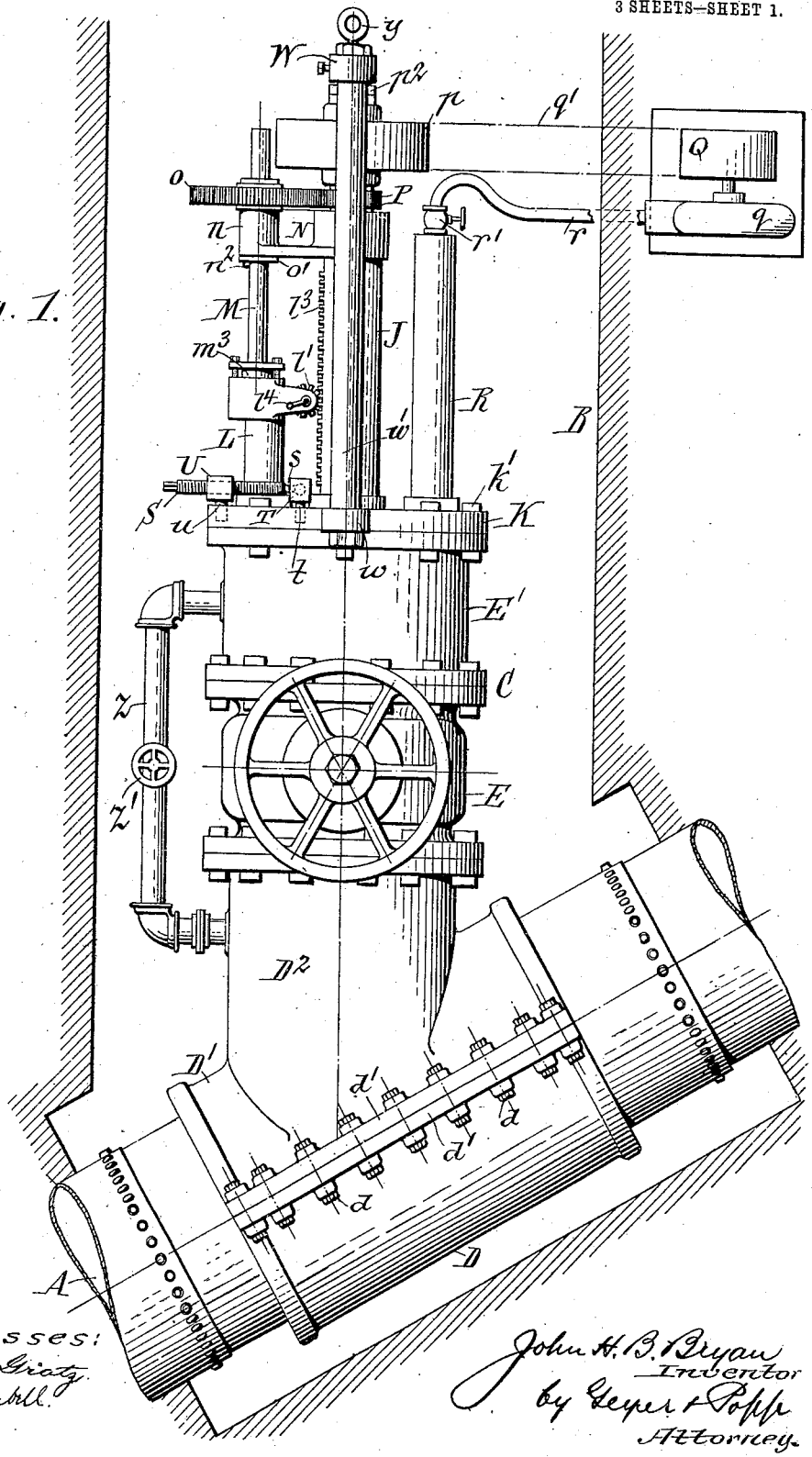

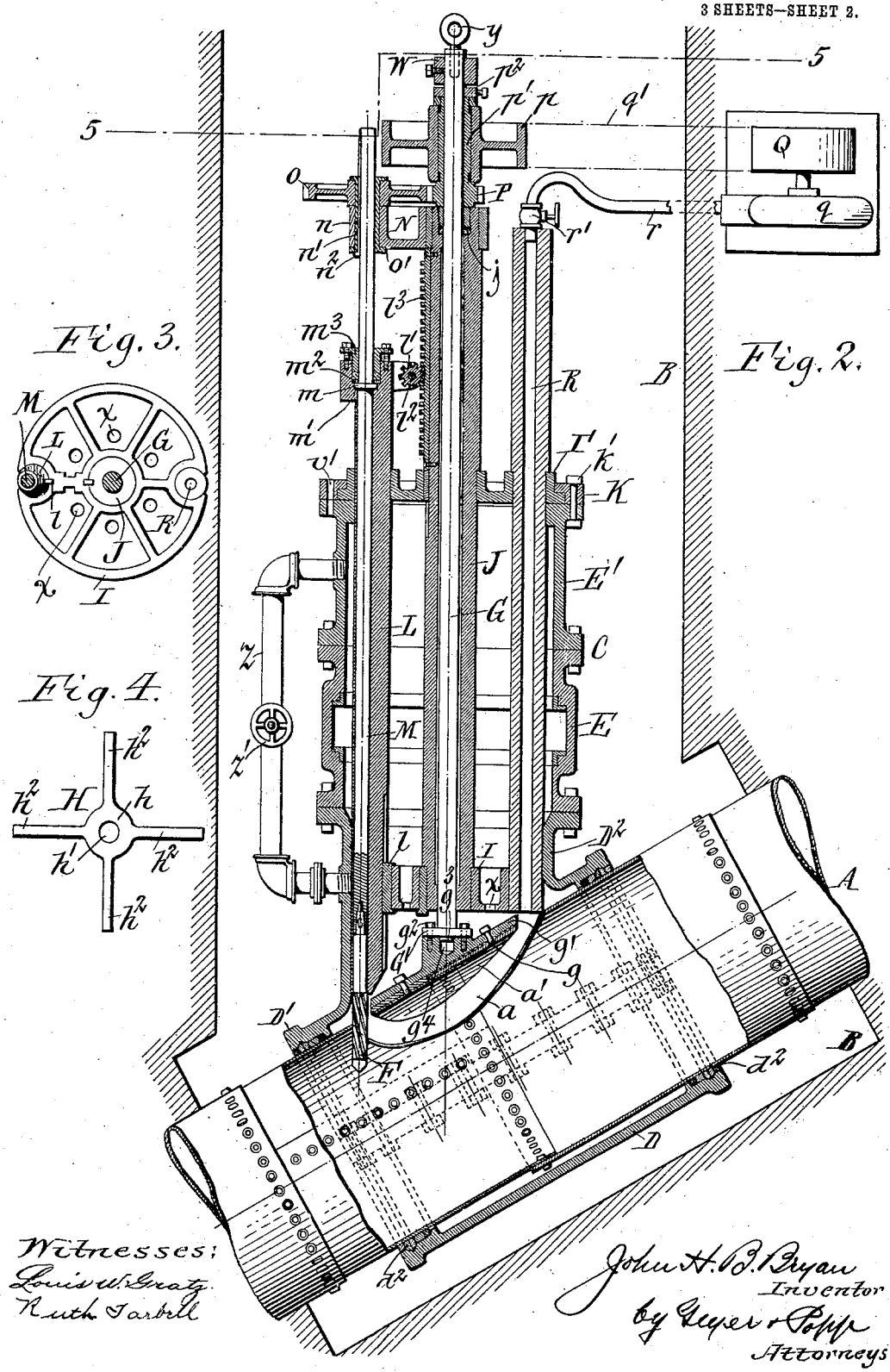

No. 884,565.

PATENTED APR. 14, 1908.

J. H. B. BRYAN.
PIPE TAPPING DEVICE.
APPLICATION FILED JAN. 11, 1906.

3 SHEETS—SHEET 3.

Witnesses
Louis W. Gratz
Ruth Tarbell

John H. B. Bryan, Inventor
by Geyer & Popp
Attorneys

UNITED STATES PATENT OFFICE.

JOHN H. B. BRYAN, OF BUFFALO, NEW YORK, ASSIGNOR, BY DIRECT AND MESNE ASSIGNMENTS, OF ONE-THIRD TO NICHOLAS J. KELLY AND ONE-THIRD TO NORA KELLY, OF BUFFALO, NEW YORK.

PIPE-TAPPING DEVICE.

No. 884,565.     Specification of Letters Patent.    Patented April 14, 1908.

Application filed January 11, 1906. Serial No. 295,527.

*To all whom it may concern:*

Be it known that I, JOHN H. B. BRYAN, a citizen of the United States, residing at Buffalo, in the county of Erie and State of New York, have invented a new and useful Improvement in Pipe-Tapping Devices, of which the following is a specification.

This invention relates to an apparatus for tapping main pipes and connecting branch pipes therewith without interfering with the use of the main pipes.

Connections of this sort must frequently be made with the large suction mains or the delivery mains of water supply systems in which it is undesirable to shut down the flow of water through the mains while the connection of a branch pipe with the main is being effected.

It is the object of this invention to provide an apparatus of simple and reliable construction whereby the operation of tapping a main pipe or other conduit and connecting a branch pipe therewith may be effected easily and expeditiously and without interrupting the flow of water through the main while this operation is going on.

In the accompanying drawings consisting of three sheets, Figure 1 is a top plan view showing the tapping apparatus applied to a main pipe. Fig. 2 is a horizontal longitudinal section of the same. Fig. 3 is a front view of the carrier or supporting frame and the retaining bar and cutter mounted thereon and indicated in section. Fig. 4 is a detached elevation of the guide for use in boring and tapping the screw holes in the main pipe for attaching the plate of the retaining rod. Fig. 5 is a vertical transverse section in line 5—5, Fig. 2 showing the gear wheel removed from the cutter spindle or shank. Fig. 6 is a vertical longitudinal section of the gate valve whereby the flow of water through the branch pipe is controlled. Fig. 7 is a detached view of the mains for preventing inward movement of the retaining rod.

Similar letters of reference indicate corresponding parts throughout the several views.

If the main water pipe A is underground a trench B is dug for exposing that part of the main with which it is desired to connect the branch pipe C but if the main is submerged in water suitable a cofferdam is built around such part of the main pipe to permit of tapping the same and connecting the branch pipe therewith.

Although the branch pipe, if desired, may be connected with the main pipe at right angles to the latter it is preferable to make such connection between these pipes at an oblique angle relatively to each other as it has been found in practice that water will flow more freely from one pipe to another when the connection between the same is made in this manner and the pipe tapping apparatus shown in the drawings has therefore been constructed to tap the main pipe and connect the branch pipe therewith accordingly.

Preparatory to beginning the tapping operation a tee-shaped pipe fitting or coupling is applied to the exposed part of the main. This fitting has its main part or head divided lengthwise and diametrically into two sections D, D' and one of these parts or sections is provided with a tubular branch $D^2$ which constitutes the beginning or first part of the branch pipe C which is to be connected with the main. The sections of the head of the tee-fitting may be connected on opposite sides of the main by any suitable means.

As shown in Figs. 1 and 5 of the drawings this connection consists of bolts or screws $d$ passing through flanges $d'$ on the opposing longitudinal edges of the sections of the tee-head. After the sections of the head of the tee-fitting have been thus fastened around the main a water tight joint is formed between the ends of this head and the main by a packing or calking $d^2$ of any suitable kind secured firmly between each end of the head of the tee-fitting and the adjacent part or the main.

The body E of a gate valve is secured with one end of its passage to the branch of the tee-fitting and a short section of pipe E' is connected with the outer or opposite end of the valve passage. This valve and short pipe section also form part of the branch pipe or conduit which is to be connected with the main and these parts if desired may be formed in one piece with the branch of the tee-fitting or coupling but in practice it is more desirable to construct the same separately as this permits of employing any of the standard types of gate valves now upon the market.

In the operation of tapping the main a circular cut or kerf $a$ is produced the outer diameter of which is substantially the same as that of the bore of the branch of the tee-coupling and a circular section or patch $a'$ of the main is removed.

F represents the cutter whereby the opening is formed in the side of the main for establishing communication between the latter and the branch pipe. This cutter has its front end constructed in the form of a drill so that upon moving the same forward axially against the main the latter will be perforated by the cutter. In rear of the front or drill end of the cutter the latter is constructed in the form of a miller or side cutting tool so that upon rotating the cutter about its own axis and also moving the same bodily laterally in a circle within the boundary of the branch of the tee-fitting or coupling a circular kerf will be formed in the side of the main which completely severs a section or "patch" $a'$ from the side of the main which section is subsequently removed to form an unobstructed passage between the main and the branch pipe. The "patch" is liable to be carried away by the pressure of the water if no provision is made to prevent it from being drawn inwardly and would interfere with the water system. This is particularly liable to happen when the connection of the branch pipe is to be made with the suction main of a water line. In order to avoid such an occurrence means are provided for retaining control of the "patch" the means for this purpose shown in the drawings consisting of a retaining bar or rod G arranged axially relatively to the branch pipe and other parts of the apparatus and connected at its inner end to an attaching plate $g'$ by screws passing through a flange $G'$ on the inner end of the shaft G, the attaching plate being in turn secured by screws $g^2$ or otherwise to the section or "patch" of the main which is to be cut out. The retaining rod must be secured to the main pipe in perfect axial alinement with the branch pipe in order to avoid cramping the same and other parts which receive said rod and rotate about the same. For this purpose a temporary guide H is provided which is constructed in the form of a spider and consists of a hub $h$ having a central opening $h'$ and centering arms $h^2$ radiating from said hub.

In applying the retaining rod to the section or "patch" of the main pipe which is to be removed this rod is first connected with the attaching plate $g'$ by the screws $g^2$ and then the attaching plate is fastened to the "patch" by means of the screws $g$ passing through openings in the attaching plate and into openings formed in the "patch". The front end of the shaft or rod G is provided with a central stud $g^3$ which enters a socket $g^4$ in the attaching plate for holding these parts in alinement relatively to each other. The openings in the attaching plate are employed as a templet for boring and threading the openings in the "patch". While this boring of the "patch" is being effected the attaching plate and the retaining rod are held temporarily in an accurately centered position relatively to the bore of the branch of the tee-fitting or coupling by means of the guide H the central opening $h'$ of which receives the retaining rod G while the outer end of its arms $h^2$ engage with the inner side of the bore of the coupling branch. The bore of this branch of the tee-coupling or fitting is accurately machined in order to permit of thus securing the retaining rod in a central position on the "patch". After the retaining rod has been secured on the "patch" the temporary guide H is removed.

Owing to the cylindrical form of the main pipe, also on account of the oblique arrangement of the branch pipe relatively thereto the cutter in moving bodily in a circle for producing the kerf must also be moved bodily backward and forward in a direction lengthwise of its axis for bringing the cutter successively in engagement with all parts of the main which are arranged at different distances from a line at right angles to the plane of rotation of the cutter.

Various means may be employed for thus rotating the cutter about its own axis, moving the same bodily in a circle and also moving the same lengthwise on its axis, the means for this purpose shown in the drawings being constructed as follows:

Within the branch of the tee-coupling, the passage of the gate-valve and the short pipe-section constituting parts of the branch pipe is mounted a rotary carrier or frame the axis of which is concentric with the bore of these parts, and the retaining rod of the "patch". This frame preferably consists of a circular front or inner head I, a circular outer or rear head I' and a central longitudinal bar or axle J which is connected centrally with the front or inner head and projects outwardly or rearwardly through a central opening in the rear head, as shown in Fig. 2. The front head I is fitted accurately in the branch of the tee-coupling so as to be capable of rotating and also moving axially therein, this being possible by machining the bore of this branch so that the carrier is maintained in a perfectly central position relatively to the coupling branch and the retaining rod about which the carrier rotates. The outer head I' is accurately centered relatively to the branch pipe section E' and the retaining rod G by engaging the periphery of this head in a groove formed between the outer end of the pipe section E' and a retaining ring K secured to this end of said pipe by bolts $k'$ the bearing surfaces of these parts being previously machined for this purpose. The retaining rod G passes centrally through the axle which latter is made hollow for receiving the same and projects with its outer end beyond the outer end of the axle. For the purpose of preventing leakage between the axle and the retaining rod a stuffing box or packing $j$ is arranged on the outer end of the axle around the retaining rod, as shown in Fig. 2.

L represents a cylindrical supporting bar arranged lengthwise of the carrier and seated in correspondingly shaped openings formed in the heads I I' at the periphery thereof. This bar is held against rotation in these heads but is permitted to move lengthwise therein by means of a spline $l$ interposed between the front head and said bar as shown in Fig. 2.

M represents a shank, spindle or tool shaft which carries the cutter F at its front end and which is journaled in a bearing formed lengthwise in the supporting bar adjacent to the periphery of the carrier heads. By this construction the cutter is brought as near as possible to the bore of the coupling branch and enables the same to cut an opening in the main pipe of substantially the same diameter as the bore of the branch pipe. This cutter shank is free to turn in the bearing of the supporting bar L but is held against axial movement relatively thereto by means of a collar $m$ formed near the outer end thereof and bearing on its inner side against a shoulder $m'$ formed in the bottom of a stuffing box on the outer end of the supporting bar L and a ring $m^2$ arranged in the stuffing box and bearing against another shoulder in the stuffing box at the outer side of said collar. This retaining ring is held in place and leakage around the shank at this point is prevented by means of a gland $m^3$ arranged in the stuffing box between the retaining ring $m^2$ and the gland and secured to the supporting bar.

The longitudinal movement of the supporting bar L together with the shank and cutter may be effected by any suitable means but preferably by means of a gear pinion $l'$ mounted on a transverse shaft $l^2$ which is journaled at the outer end of the supporting bar and a longitudinal gear rack $l^3$ secured to the outer part of the axle and meshing with said gear pinion. Upon turning the gear pinion by means of a crank $l^4$ applied to one end of the shaft or otherwise the supporting bar may be moved forward or backward in order to shift the cutter successively to the different parts of the main which are to be cut in forming the opening.

Although various means may be employed for rotating the cutter and its shank that shown in the drawings has been found satisfactory and is constructed as follows: N represents a laterally projecting bracket secured to the outer end of the axle and provided on one side of the axle with a bearing $n$ in which a sleeve $n'$ is journaled parallel to the axle and in line with the cutter shank. $o$ represents a gear wheel secured to the rear end of the sleeve $n'$. The latter is free to turn on the bearing of the bracket together with the gear wheel attached thereto but is prevented from moving axially in said bearing by the gear wheel $o$ engaging with the outer end of the bearing $n$ and a flange $o'$ formed on the front end of said sleeve and engaging with the front end of said bearing. The outer end of the cutter shank passes through the sleeve $n'$ and is compelled to turn therewith but is free to move lengthwise independent thereof by means of a spline $n^2$ interposed between these parts. P represents a gear pinion mounted loosely on the outer end of the retaining rod and meshing with the gear wheel $o$ of the cutter shank, $p$ represents a pulley which is secured to an outward extension $p'$ of the hub of the pinion P, said pinion and pulley being held against axial movement on the retaining rod by the inner end of the pinion hub engaging with the outer end of the axle and a collar $p^2$ secured to the retaining rod and engaging with the outer end of the hub extension $p$. Q represents the driving wheel of a motor $q$ which is mounted on the top of the ground or cofferdam on one side of the excavation or exposed part of the main. Motion is transmitted from this driving pulley to the driven pulley $p$ on the retaining rod by a belt $q'$ passing with its end portions around said driving and driven pulleys and with its intermediate portions around guide wheels or pulleys $q^2$ which are mounted on a bridge $q^3$ spanning the trench or space over the branch pipe, as shown in Figs. 1, 2 and 5. Any suitable kind of motor may be employed for rotating the driving wheel but it is preferable to use for this purpose a water motor. The water supply for this motor is preferably derived from the main by means of a longitudinal supply pipe R secured at its front or inner end to the inner head I of the carrier and communicating with the water space of the main after the same has been partially cut open while its outer end slides through the rear head I' and is connected with the water motor by a flexible pipe or tube $r$ which contains a valve $r'$ whereby the supply of water to the motor may be controlled. The supply pipe is arranged in the heads I I' of the carrier adjacent to the periphery thereof and diametrically opposite to the cutter supporting bar L and is made comparatively heavy so as to counterbalance the cutter supporting bar in addition to serving as a water conduit for the motor.

The rotation of the cutter for producing the initial perforation of the water main and the first part of the kerf may be effected by hand but after a sufficiently large opening has been formed by the cutter in the main to provide an ample supply of water for running the motor the cutter is operated solely by the power derived from the motor, thereby permitting severing of the "patch" from the main for producing the connecting opening to be effected easily and rapidly.

Before beginning the cutting operation it is desirable to previously determine the required position of the cutter supporting bar in different parts of its circular movement with the carrier and these positions should be indicated on the outer head, retaining ring and supporting bar so as to enable the operator to properly guide the cutter at all times.

In cutting the opening in the side of the water main the cutting operation is preferably begun at the lowest part of the intended opening, then continues around a circle to the highest part of the cut and back again to the place of beginning at the lowest part of the cut. By this method any tendency to rotate the "patch" by contact with the cutter after the same has been completely severed from the main is reduced to a minimum, thereby preventing the "patch" from being shifted into such a position as would cramp the cutter and render its subsequent withdrawal from the opening difficult. While any suitable means may be employed for rotating the carrier and the parts mounted thereon it is preferable to use the device shown in the drawings owing to its simplicity of construction and operation. This device consists of a shifting feed screw S pivotally connected at its front end by a ball and socket joint s with an abutment or swivel head T having a laterally projecting coupling pin t and a screw nut U mounted on the rear part of the feed screw having a laterally projecting coupling pin u. On the outer sides of the rear carrier head I' and the retaining ring K are respectively formed two annular rows of openings, recesses or sockets v v'. Some of the openings in the retaining ring receive bolts k' by which this ring is connected with the short section E' of the branch pipe.

In adjusting the rotary frame or carrier circumferentially for causing the cutter to produce a circular cut in the water main, the pin of the swivel head or abutment is engaged with one of the openings of the rear carrier head while the pin of the screw nut is engaged with one of the openings in the retaining ring. Upon turning the screw S by means of a wrench or handle applied to the flat sided rear end thereof the distance between the abutment and the screw nut is either shortened or lengthened, thereby rotating the carrier relatively to the branch pipe and shifting the cutter mounted thereon accordingly on the main pipe. When the screw has been turned to such an extent that its feeding action is exhausted the same is removed from the carrier and ring K together with its abutment and nut and after being unscrewed the pins of the abutment and nut are engaged with another set of openings in the head and the retaining ring K, the particular set of openings to be used being selected by the operator as may be most convenient for effecting the rotary feeding movement of the carrier. Instead of unscrewing the screw from its nut after removing the same from the outer head I' and ring K and before reapplying the same to these parts the screw after reaching the limit of its feeding action in one direction may be removed from the outer head and ring K and then reapplied thereto in a reversed position in which case the turning of the screw in the reverse direction will cause the rotary carrier to continue its feeding movement in the same direction, thereby avoiding the loss of time incident to first reversing the screw before reapplying the same to the rotary carrier.

In order to prevent the "patch" together with the retaining rod from being drawn inwardly after the "patch" has been severed from the main and possibly interfering with the water system or the withdrawal of the tapping or boring mechanism, means are provided for securely holding the retaining rod and "patch" against inward movement after the cutting operation has been completed. The preferred means for this purpose consists of a cross bar or head W secured with its central part to the outer end of the retaining rod and connected at its opposite ends with laterally projecting lugs w on the retaining ring K by means of longitudinal stay rods or bars w' w', as shown in Figs. 1, 5 and 7.

After the cutting of the first part of the opening in the main has been effected the water escaping therefrom passes through openings x in the front head I of the carrier into the gate valve and branch pipe section E' so that these parts are under pressure but the escape of water from the outer end of the branch pipe section E' is prevented by the outer head I' of the rotary carrier which is fitted sufficiently tight for this purpose. After the cutting operation has been completed the cutter supporting bar L, the axle and the combined counterbalancing rod and pipe R are drawn rearwardly through the outer head of the rotary carrier until the front head of the same together with the "patch" and the cutter in front thereof have been withdrawn into the space of the branch pipe outside or in rear of the gate valve. Upon now closing the gate e of the latter and shutting off the water pressure from the outer part of the branch pipe the retaining ring K may be detached from the branch pipe and the boring apparatus wholly removed from the branch pipe and lifted out of the excavation or cofferdam.

For convenience in lowering the apparatus into or lifting the same out of the excavation of the cofferdam a screw eye $y$ is applied to the outer end of the retaining rod for the reception of a suitable hoisting tackle. The branch pipe may now be extended from the section E in the usual manner.

After the tee-fitting, the gate valve and short branch pipe section E' have been put in place and before the boring operation of the main is effected a by-pass pipe Z containing a hand valve Z' is extended from the branch of the tee-fitting to the short pipe section E'. These parts are permanently connected with the water system and are intended to permit a partial flow of water from the pressure side of the gate valve to the opposite side thereof for reducing the unbalanced pressure against the valve and permitting the same to be opened more easily in a well known manner.

Although my pipe tapping device is particularly useful for connecting water mains with branch pipes the same is equally desirable for making such a connection between a gas main and branch pipe or for other pipes which should not be shut down while making such connection.

I claim as my invention:

1. A device for producing an opening in a main pipe which connects the same with a branch pipe, comprising a carrier adapted to rotate in the branch pipe, and a tool shaft journaled on said carrier at a distance from the center thereof, and adapted to receive a cutter, substantially as set forth.

2. A device for producing an opening in a main pipe which connects the same with a branch pipe, comprising a carrier adapted to rotate in the branch pipe, and a tool shaft rotatably mounted on said carrier at a distance from its center and also capable of axial movement thereon, substantially as set forth.

3. A device for producing an opening in a main pipe which connects the same with a branch pipe, comprising a carrier adapted to be rotated in said branch pipe, a supporting bar arranged on the carrier at a distance from its center and capable of longitudinal movement thereon, and a tool shaft rotatable on said bar but held against axial movement thereon, and adapted to receive a cutter, substantially as set forth.

4. A device for producing an opening in a main pipe which connects the same with a branch pipe, comprising a carrier adapted to be rotated in said branch pipe, a supporting bar arranged on the carrier at a distance from its center and capable of longitudinal movement on the same, a tool shaft rotatable in said bar but held against axial movement therein, and adapted to receive a cutter, and means for effecting the longitudinal movement of said supporting bar consisting of a gear rack arranged on said frame, and a gear pinion mounted on said supporting bar and meshing with said gear rack, substantially as set forth.

5. A device for producing an opening in a main pipe which connects the same with a branch pipe, comprising a carrier adapted to be rotated in said branch pipe, a supporting bar arranged on said carrier at a distance from its center and capable of longitudinal movement thereon a tool shank or shaft rotatable in said bar but held against axial movement therein, and adapted to receive a cutter, and means for rotating said shank consisting of a sleeve which is splined on said shank for compelling the latter to turn with the sleeve but enabling the same to move lengthwise independent thereof, a bearing arranged on said carrier in which said sleeve turns but is held against axial movement, a gear wheel connected with said sleeve, and a pinion journaled concentrically relatively to said carrier and meshing with said gear wheel, substantially as set forth.

6. A device for producing an opening in a main pipe which connects the same with a branch pipe, comprising a rotatable carrier having a head adapted to be journaled on the outer end of said branch pipe, and a cutter rotatable on said carrier at a distance from the center thereof and constructed to form said opening, substantially as set forth.

7. A device for producing an opening in a main pipe which connects the same with a branch pipe, comprising a carrier having a circular head, a ring adapted to be secured to the outer end of said branch pipe and constructed to form with the same an annular groove which receives the periphery of said head, and a cutter rotatably mounted on said carrier at a distance from its center and constructed to form said opening, substantially as set forth.

8. A device for producing an opening in a main pipe which connects the same with a branch pipe, comprising a carrier having an inner head which is adapted to be journaled on the inner end of said branch pipe and an outer head which is adapted to be journaled on the outer end of said branch pipe, and a cutter rotatably mounted on said carrier at a distance from its center and constructed to form said opening, substantially as set forth.

9. A device for producing an opening in a main pipe which connects the same with a branch pipe, comprising a carrier having an outer head which is adapted to be journaled on said branch pipe, an inner head adapted to be rotated within the branch pipe and a central axle secured to said inner head and slidable through said outer head, and a cutter mounted on said carrier at a distance from its center and constructed to form said opening, substantially as set forth.

10. A device for producing an opening in a main pipe which connects the same with a branch pipe, comprising a carrier rotatable in said branch pipe, a cutter mounted on said carrier at a distance from its center and constructed to form a circular kerf in the main pipe, and a retaining rod arranged centrally in said carrier and adapted to be attached to the section of the main pipe which is to be removed by said cutter, substantially as set forth.

11. A device for producing an opening in a main pipe which connects the same with a branch pipe, comprising a carrier rotatable in said branch pipe, a cutter mounted on said carrier at a distance from its center and constructed to form a circular kerf in the main pipe, an attaching plate adapted to be fastened to the section of the main pipe which is to be removed by said cutter, and a retaining rod arranged centrally in said carrier and connected at its inner end with said plate, substantially as set forth.

12. A device for producing an opening in a main pipe which connects the same with a branch pipe, comprising a carrier rotatable in said branch pipe, a cutter mounted on said carrier at a distance from the center thereof and constructed to form a circular kerf in the main pipe, a retaining rod mounted on said carrier and adapted to be connected with the section of the main pipe which is to be removed by said cutter, and means for holding said rod against inward movement, substantially as set forth.

13. A device for producing an opening in a main pipe which connects the same with a branch pipe, comprising a carrier adapted to be rotated within the branch pipe, a cutter mounted on said carrier at a distance from its center and constructed to form a circular kerf in the main pipe, a retaining rod arranged in said carrier and adapted to be connected at its inner end with the section of the main pipe which is to be removed by said cutter, and means for holding the retaining rod against inward movement consisting of a cross head connected centrally with the outer end of said rod and stay rods connected with the ends of said cross head, substantially as set forth.

14. A device for producing an opening in a main pipe which connects the same with a branch pipe, comprising a carrier adapted to be rotated within the branch pipe a cutter mounted on said carrier at a distance from its center and constructed to form said opening, a guide ring for rotatably securing said carrier to said branch pipe, a retaining rod arranged in said carrier and adapted to be connected at its inner end with the section of the main pipe which is to be removed by the cutter, and means for holding the retaining rod against inward movement consisting of a cross head secured with its central part to the outer end of retaining rod, and stay rods connecting the ends of said cross head with said guide ring, substantially as set forth.

15. A device for producing an opening in a main pipe which connects the same with a branch pipe comprising a carrier having an outer head adapted to be rotated on the outer end of the branch pipe, an inner head adapted to be rotated within the branch pipe and also moved axially therein and a central axle connected with the inner head and slidable through the outer head, a longitudinally movable supporting bar guided in said heads at a distance from the center of the carrier, a rotary shank journaled in said bar but held against axial movement therein, a cutter arranged on the inner end of the shank and constructed to form a circular kerf in the main pipe, a gear pinion mounted on the supporting bar and meshing with a gear rack on the outer end of said axle, a retaining rod arranged in said axle and adapted to be connected at its inner end with the section of the main pipe which is to be removed by said cutter, a gear wheel connected with the shank so as to turn therewith but held against axial movement relatively thereto, and a pinion mounted on the outer end of said retaining rod and meshing with said gear wheel, substantially as set forth.

16. A device for producing an opening in a main pipe which connects the same with a branch pipe, comprising a supporting carrier adapted to be arranged in the branch pipe, a cutter rotatably mounted on said carrier at a distance from its center and constructed to form said opening, and means for rotating said frame comprising an abutment and a screw nut one of which is operatively connected with the carrier and the other with a stationary part and a screw operatively engaging with said nut and abutment, substantially as set forth.

17. A device for producing an opening in a main pipe which connects the same with a branch pipe, comprising a carrier having a head adapted to be rotatably journaled on the branch pipe and provided with an annular row of openings, a cutter rotatably mounted on the carrier at a distance from its center and constructed to form said opening, a guide ring adapted for rotatably connecting said head with the branch pipe and provided with an annular row of openings, and means for rotating the carrier consisting of an abutment having a pin adapted to enter an opening in one of said rows, a screw nut having a pin adapted to enter an opening in the other one of said rows, and a feed screw working in said nut and pivotally connected with said abutment, substantially as set forth.

18 A device for producing an opening in a main pipe which connects the same with a branch pipe, comprising a carrier adapted to be rotated in the branch pipe, a cutter mounted on said support and constructed to form said opening and means for actuating said cutter comprising a motor and a conduit communicating with said opening and arranged to deliver the pressure medium from said pipe to the motor for driving the same and having a part thereof formed in said carrier, substantially as set forth.

19. A device for producing an opening in a main pipe which connects the same with a branch pipe, comprising a carrier having an outer head adapted to be rotated in the branch pipe, and an inner head adapted to be rotated in the branch pipe and also moved axially therein, a cutter mounted on said carrier and constructed to form said opening means for actuating said cutter comprising a water motor, and a conduit for carrying the water from the opening in said pipe to said motor comprising a pipe connected at its inner end with said inner head and slidable with its outer part through said outer head, substantially as set forth.

Witness my hand this 6th day of January, 1906.

JOHN H. B. BRYAN.

Witnesses:
THEO. L. POPP,
E. M. GRAHAM.